Figure 1:
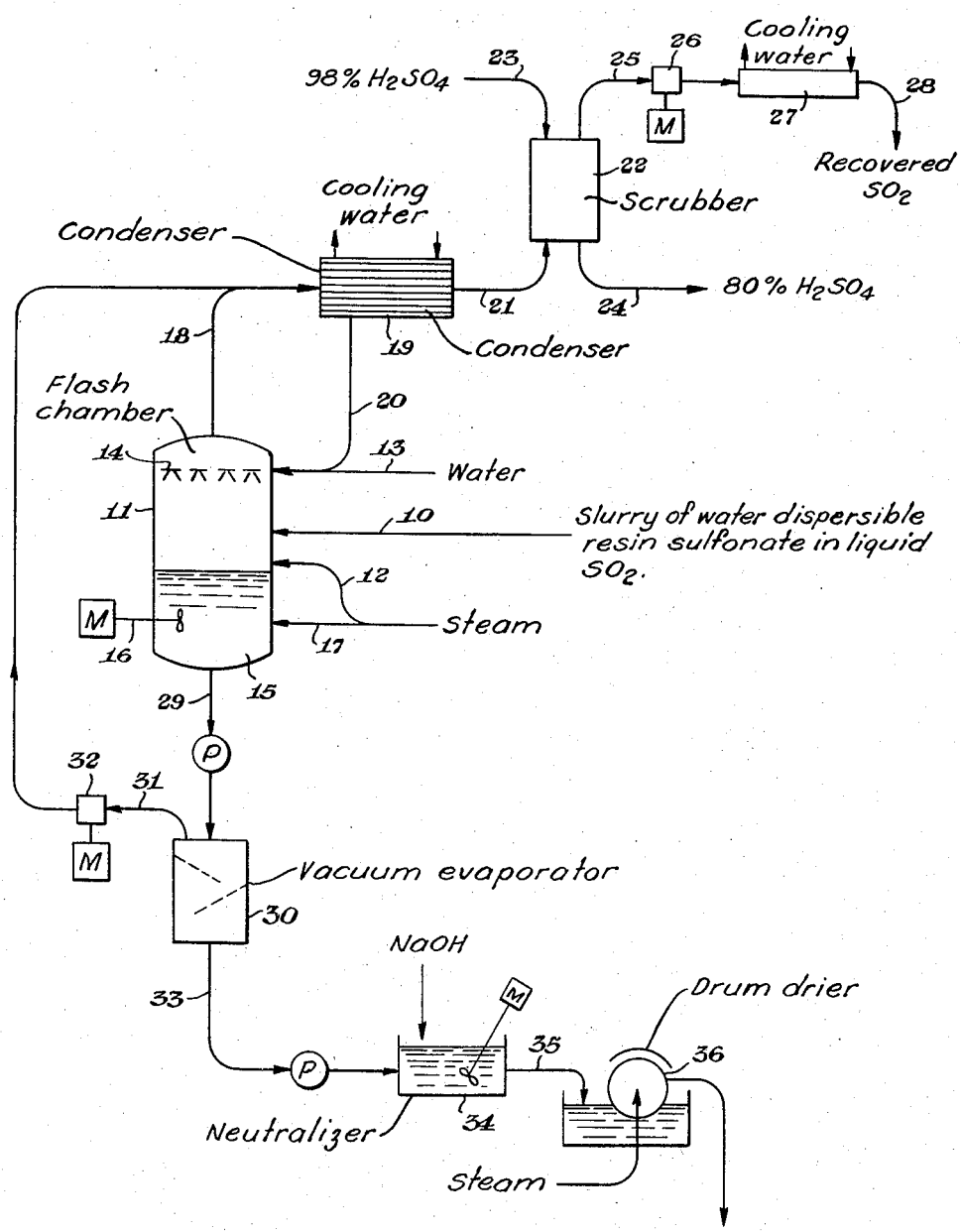

INVENTOR.
Jacob Eichhorn

United States Patent Office 2,877,213
Patented Mar. 10, 1959

2,877,213

RECOVERY OF SULFONATED POLYMERS FROM NON-AQUEOUS SLURRIES

Jacob Eichhorn, Saginaw, Mich., assignor to The Dow Chemical Company, Midland, Mich., a corporation of Delaware Application June 4, 1956, Serial No. 589,080

3 Claims. (Cl. 260—79.3)

This invention relates to the recovery of water-dispersible resin sulfonates from slurries thereof in non-aqueous liquids such as liquid sulfur dioxide and liquid chlorinated aliphatic hydrocarbons used as media for sulfonation of resins, e. g. polymerizates of mono-alkenylaromatic compounds such as polystyrene. It particularly pertains to an improved method of operation whereby the resin sulfonates can be recovered in a form substantially free of the non-aqueous liquid medium and the latter can be recovered in a useable condition.

It is known that water-dispersible resin sulfonates can be obtained by sulfonating benzene-soluble polymers and co-polymers such as polystyrene with sulfonating agents such as sulfuric acid, chlorosulfonic acid or sulfur trioxide. Improved methods of sulfonation have been described wherein the sulfonation agent is sulfur trioxide and wherein the operations are carried out in inert non-aqueous liquid media such as liquid sulfur dioxide, liquid chlorinated aliphatic hydrocarbons, and mixtures of such materials. For example, United States Patent 2,691,644, issued October 12, 1954, to Harold H. Roth describes the sulfonation of benzene-soluble thermoplastic polymers and copolymers of mono-alkenylaromatic compounds, such as polystyrene, with sulfur trioxide in liquid mixtures of sulfur dioxide and chlorinated aliphatic hydrocarbons as reaction medium. United States Patent 2,640,820, issued June 2, 1953, to Arthur S. Teot and Glenn C. Wiggins describes the sulfonation of polymers and copolymers of monoalkenylaromatic compounds, such as polystyrene, with sulfur trioxide in a liquid perchlorinated hydrocarbon such as carbon tetrachloride as reaction medium. A co-pending application, S. N. 272,889, filed February 21, 1952, by Arthur S. Teot, now U. S. Patent 2,763,634, issued September 18, 1956, described sulfonation of alkenylaromatic resins with sulfur trioxide in an inert liquid chlorinated aliphatic hydrocarbon medium comprising or consisting of methylene chloride.

While these improved methods of sulfonation are advantageous in producing desirable kinds of resin sulfonates, difficulties are incurred in recovering the sulfonate product from the reaction mixture. Operations in the manner described result in a reaction product mixture which is a slurry of the resin polysulfonic acid in a liquid suspending medium. The resin polysulfonic acid particles or granules are insoluble in such liquid as liquid sulfur dioxide, carbon tetrachloride, methylene chloride, and mixtures thereof, but the solid particles are highly swollen with such liquids. In the above-cited patents and application it is proposed to separate the solid resin sulfonic acid granules from the major part of the liquid medium by filtration of the reaction product slurry.

Filtration of the sulfonation reaction product slurry comprising highly swollen, gelatinous masses is troublesome, particularly on a large, e. g. commercial, scale. The swollen solid sulfonate quickly clogs the filter medium and hinders further flow of liquid therethrough. Furthermore, the collected solid sulfonate is still highly swollen with the liquid medium which is difficult to recover economically from such material. Usually, the swollen cake is dried by heating to evaporate the liquid contained therein, and much of the latter is irretrievably lost in that operation. When sulfur trioxide or chlorosulfonic acid is employed as sulfonation agent, small amounts of unreacted sulfonation agent often remain in the reaction product slurry and more or less of this unreacted material clings in the swollen solid mass after filtration. In the subsequent heating step, the residual sulfonation agent, such as sulfur trioxide, undergoes undesirable side reactions with the resin sulfonate, e. g. crosslinking reactions. In view of these observations, the recovery by filtration of resin sulfonates from the reaction product slurries obtained by sulfonation of resins such as benzene-soluble, thermoplastic polymers and copolymers of mono-alkenylaromatic compounds in inert non-aqueous liquid reaction media is regarded as unsatisfactory, principally because the mechanical operation of filtration in this case is tedious, the recovery of the liquid medium is incomplete, and the recovery of the resin sulfonate is usually accompanied by undesired changes in the structure of the product.

The general object of this invention is to provide an improved method for the recovery of water-dispersible resin sulfonates from reaction product slurries obtained by sulfonation of resins such as benzene-soluble, thermoplastic polymers and copolymers of mono-alkenylaromatic compounds in inert non-aqueous liquid reaction media, which method obviates the operation of filtration of the reaction product slurries and thereby obviates the difficulties and objections inherent in such operation.

It is an object of this invention to provide such a method whereby the resin sulfonate product can be recovered in a form substantially free of the inert liquid medium and substantially without detrimental change in molecular structure of the resin sulfonate during such recovery.

A further object is to provide such a method in which the inert liquid medium can be substantially recovered in a useable condition.

Further objects and advantages of the invention are evident in the following description.

The objects of this invention are attained in a novel method which comprises feeding a slurry of a water-dispersible resin sulfonate, obtained by sulfonation of a solid resin, e. g. a polymerizate of a mono-alkenylaromatic compound, in an inert non-aqueous, steam-volatile liquid reaction medium, into a flashing zone containing liquid water and water vapor at a temperature and pressure at which in the presence of water the inert liquid reaction medium is substantially in the vapor state, withdrawing from the flashing zone a vapor stream comprising vapors of the inert liquid medium, and obtaining in the flashing zone an aqueous dispersion of the resin sulfonate.

Figure 2:
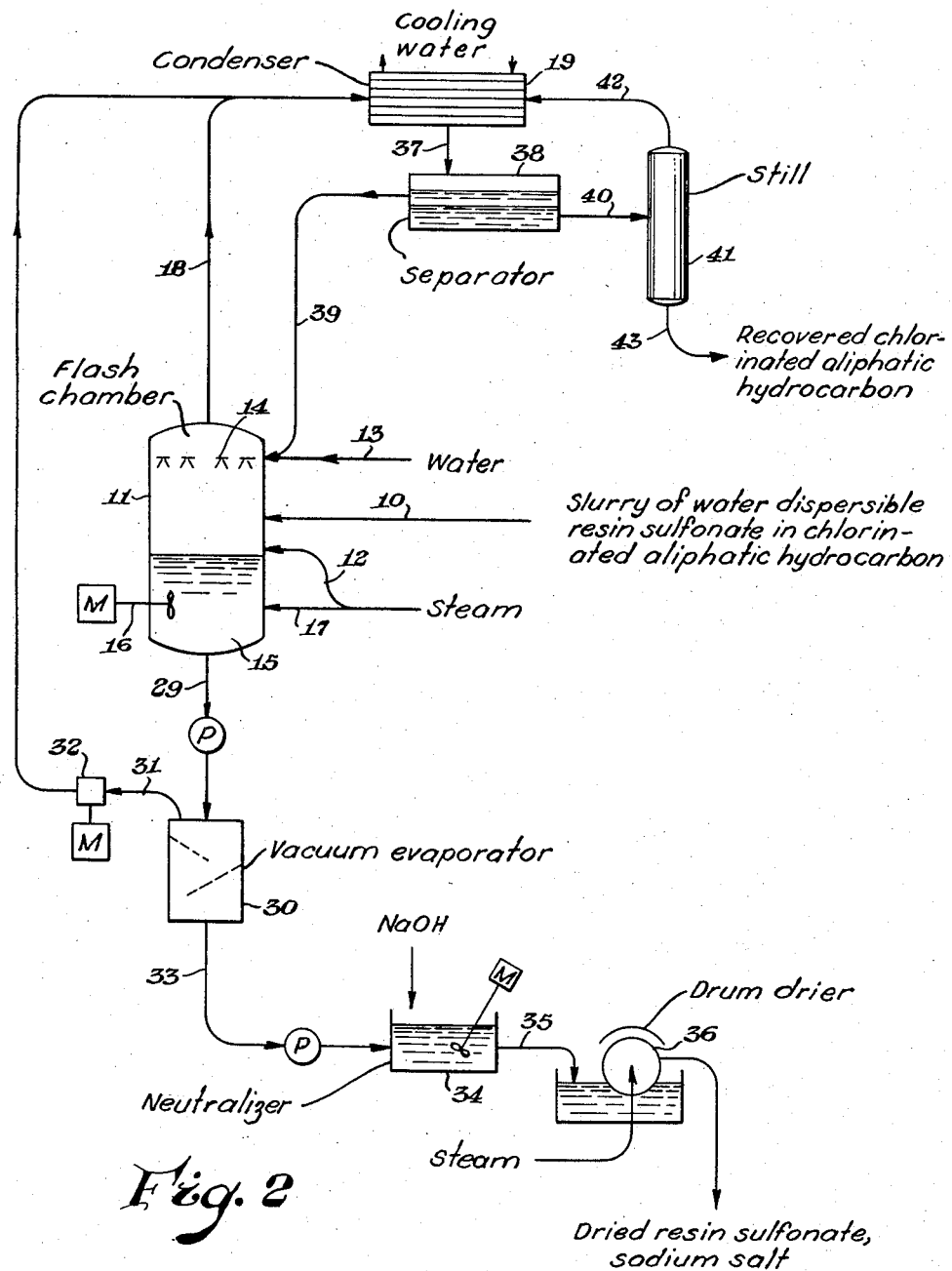

The drawing shows several embodiments of this invention. Figure 1 is a schematic representation of the application of the invention to a sulfonation reaction product slurry of a sulfonated polymer in liquid sulfur dioxide medium. Figure 2 is a schematic representation of the invention as applied to a sulfonation reaction product slurry of a sulfonated polymer and a liquid chlorinated aliphatic hydrocarbon medium.

The invention is applicable to reaction product slurries of water-dispersible resin sulfonates obtained in accordance with known art. Water-dispersible resin sulfonates can be obtained by sulfonation of a benzene-soluble, thermoplastic solid resin, especially mono-alkenylaromatic resins, with a sulfonation agent such as sulfur trioxide in inert non-aqueous liquid reaction media. Suitable mono-alkenylaromatic resin starting materials are benzene-soluble, thermoplastic polymerizates of ethylenically unsaturated compounds, which polymerizates contain, in chemically combined form, at least 50 percent by weight of at least one mono-alkenylaromatic compound having the general formula $$\text{Ar}-\underset{\underset{R}{|}}{C}=CH_2$$

wherein the symbol Ar represents a monovalent aromatic radical, the symbol R represents hydrogen or a methyl radical, and the other symbols have their usual meanings. Examples of mono-alkenylaromatic resins which can be sulfonated to produce water-dispersible resin sulfonates in accordance with known art are the solid homopolymers of styrene, α-methylstyrene, ar-methylstyrene, ar-ethylstyrene, α,ar-dimethylstyrene, ar,ar-dimethylstyrene, ar-chlorostyrene, ar-vinylnaphthalene; solid copolymers of two or more such mono-alkenylaromatic compounds, e. g. copolymers of styrene and α-methylstyrene, and copolymers of styrene and ar-methylstyrene; and solid copolymers of one or more of such mono-alkenylaromatic compounds and one or more other ethylenically unsaturated compounds such as acrylonitrile, alkyl acrylates and methacrylates, and maleic anhydride. Water-dispersible resin sulfonates can also be made from other benzene-soluble, thermoplastic resins having aromatic nuclei, such as coumarone-indene resins and soluble phenolic resinous condensation products.

Sulfonates of benzene-insoluble, crosslinked resins, such as sulfonated copolymers of mono-alkenylaromatic compounds and poly-alkenylaromatic compounds, e. g. crosslinked, benzene-insoluble copolymers of styrene and divinylbenzene, can also be recovered from their sulfonation reaction product slurries in inert liquid media by this method, provided that the particle size of the solid, water-insoluble resin sulfonates is small enough to permit colloidal dispersions in water.

The inert liquids which can serve as reaction media for preparation of resin sulfonates by sulfonation of resins in accordance with known art included inert inorganic liquids such as liquid sulfur dioxide and carbon disulfide, and chlorinated and/or fluorinated aliphatic hydrocarbons such as methylene chloride, carbon tetrachloride, ethylene dichloride, methyl chloroform, tetrachloroethylene, and mixtures thereof.

As hereinbefore described, resins can be sulfonated in inert liquid media in accordance with known art to obtain a slurry of highly swollen granules of solid resin sulfonates in such inert liquid media. In accordance with this invention, the resin sulfonate can be recovered from such slurry without detrimental change in the resin sulfonate, and the inert liquid can be recovered from the slurry in a useable condition, without filtration of the slurry.

The invention is practiced by feeding a stream of a slurry of the kind just described, containing a resin sulfonate dispersed in and swollen by an inert steam-volatile liquid medium, into a flashing zone containing both liquid water and water vapor at a temperature and pressure such that, under such conditions, the inert liquid in the feed slurry is transformed to the vapor state and the resin sulfonate in the feed slurry is transformed to an aqueous liquid dispersion.

The temperature and pressure conditions at which the operation is carried out are dependent upon the kind of inert liquid in the slurry and upon the circumstances and contingencies of the process. When the inert liquid of the feed slurry consists of, or comprises, sulfur dioxide, the conditions in the flashing zone should be such as to minimize the solubility of such sulfur dioxide in the aqueous liquid solution. Such conditions are readily obtained by maintaining the temperature in the flashing zone near the boiling point of water at the prevailing pressure, e. g. up to 100° C. at atmospheric pressure. From published data, the amount of sulfur dioxide that can be expected to be dissolved in the aqueous liquid solution at any temperature and pressure can be determined, and selection can be made from such data of suitable conditions to accomplish the results desired in practice of this invention. When the inert liquid of the feed slurry comprises or consists of a water-insoluble material such as carbon disulfide or a chlorinated or fluorinated aliphatic hydrocarbon such as methylene chloride or carbon tetrachloride, the temperature in the flashing zone should be above the boiling point of such material, or above the boiling point of the azeotrope thereof with water, whichever is the lower, at the prevailing pressure. At atmospheric pressure, minimum such temperatures are approximately as follows for typical water-insoluble inert liquid media that form azeotropes with water:

| | ° C. |
|---|---|
| $CS_2$ | 43 |
| $CH_2Cl_2$ | 38 |
| $CCl_4$ | 66 |
| $C_2H_4Cl_2$ | 72 |

The invention is conveniently carried out in a continuous manner in a vessel provided with means for feeding thereto a stream of the starting slurry, a stream of liquid water, and a stream of steam, and means for withdrawing therefrom a stream of vapor and a stream of the aqueous liquid dispersion of the resin sulfonate.

The vapor stream withdrawn from the flash vessel can be treated to separate therefrom the inert liquid in useable condition. The stream of aqueous liquid dispersion can be treated to separate the resin sulfonate therefrom.

The invention can be better understood and visualized by reference to the drawing.

In Figure 1 of the drawing, one embodiment of the invention is shown as applied to a slurry of a water dispersible sulfonated resin in liquid sulfur dioxide. The slurry is fed through line 10 into the vapor space of a flash chamber 11 to which is also fed steam via line 12 and liquid water via line 13. The contents of the flash chamber 11 are maintained close to the boiling point of water at atmospheric pressure, whereby the sulfur dioxide contained in the slurry feed stream entering via line 10 is substantially vaporized in the flash chamber. The sulfonated resin in that slurry feed stream is converted to an aqueous liquid dispersion. The liquid water entering the flash chamber via line 13 is preferably sprayed downward from a top region of the chamber through one or more spray devices 14. Such a water spray is advantageous not only in effectively scrubbing particles of the solid resin sulfonate out of the vapor space, but also breaks down any foam that tends to form in the chamber from the resin sulfonate aqueous liquid dispersion. The aqueous liquid dispersion 15 of the resin sulfonate collects at the bottom of the flash chamber. The liquid dispersion 15 is preferably agitated, e. g. by the motor-driven agitator 16, and steam is preferably blown into that liquid dispersion via line 17 to heat that dispersion and to drive out as much sulfur dioxide as possible.

The vapors from flash chamber 11 pass via line 18 into a condenser 19 wherein a part of the water vapor is condensed. The condensate (containing dissolved sulfur dioxide) from condenser 19 is preferably returned to the flash chamber 11, e. g. via line 20, whereby part of the liquid water feed is supplied. In this case, only a part of the water is fed via line 13. The sulfur dioxide contained in solution in the condensate flowing through line 20 is promptly revaporized in the flash chamber 11. The uncondensed vapors emerging from condenser 19, richer in sulfur dioxide than the vapors entering the condenser, pass via line 21 to a sulfuric acid scrubber 22, to which is fed a stream of concentrated, e. g. 98 percent by weight, sulfuric acid via line 23. In the scrubber 22, the sulfur dioxide-containing gas is contacted in counter-current with the sulfuric acid, which removes from the gas stream the remaining water vapor. From the scrubber 22 there is removed a stream of sulfuric acid aqueous solution, e. g. 80 percent by weight sulfuric acid, via line 24, and a stream of substantially anhydrous sulfur dioxide gas via line 25. The latter, i. e. the anhydrous sulfur dioxide gas, can be compressed in compressor 26, cooled and liquified in the cooler 27 and taken to storage or other use via line 28 as recovered, useable sulfur dioxide.

From the flash chamber 11, the aqueous liquid dispersion 15 of the resin sulfonic acid is withdrawn via line 29. This hot dispersion might still contain a small amount of dissolved sulfur dioxide. In order to reduce the sulfur dioxide concentration, the dispersion is desirably pumped into a vacuum evaporator 30, where, under reduced pressure, the aqueous liquid is partially evaporated. A sulfur dioxide-containing vapor is withdrawn via line 31 through the evacuator 32, e. g. a vacuum pump, and can be passed into the condenser 19 together with the vapors from line 18 for recovery of the sulfur dioxide therein. The concentrated aqueous liquid dispersion of resin sulfonic acid obtained in evaporator 30 is withdrawn via line 33 and is pumped into a neutralizer 34 where the resin polysulfonic acid can be mixed and interacted with an alkali such as sodium hydroxide to form the resin sulfonate salt. The resulting salt dispersion is withdrawn from the neutralizer 34 via line 35 to a drier, e. g. a drum drier 36, where the water is evaporated, leaving a dried resin sulfonate, e. g. sodium salt.

The operations shown in Figure 1 wherein the vapor stream taken from the flash chamber 11 via line 18 is treated to recover the sulfur dioxide obtained therein are illustrative of a suitable and preferred procedure for recovery of the sulfur dioxide in such vapors. Alternatively, other uses can be made of the sulfur dioxide-containing vapors, or the sulfur dioxide contained therein can be recovered by means other than those shown, e. g. by distillation.

Figure 2 of the drawing shows an embodiment of the invention for use with a starting slurry of a water-dispersible sulfonated resin in a chlorinated aliphatic hydrocarbon liquid medium. In this embodiment, the slurry is fed through line 10 into the vapor space of a flash chamber 11 to which is also fed steam via line 12 and liquid water via line 13. The contents of the flash chamber 11 are maintained at a temperature at least at, and preferably above, the boiling point of the liquid chlorinated aliphatic hydrocarbon in the presence of water, whereby the chlorinated aliphatic hydrocarbon contained in the feed slurry entering via line 10 is vaporized in the flash chamber and formation of two liquid phases in the flash chamber is prevented. The sulfonated resin in that feed slurry is converted to a liquid aqueous dispersion. The liquid water entering the flash chamber via line 13 is preferably sprayed downward from a top region of the chamber through one or more spray devices 14 for reasons as set forth in the description of Figure 1. The aqueous liquid dispersion 15 of the resin sulfonate collects at the bottom of the flash chamber. The liquid dispersion 15 is preferably agitated, e. g. by the motor-driven agitator 16, and steam is preferably blown into that liquid dispersion via line 17 to heat the same and to drive out as much chlorinated aliphatic hydrocarbon as possible.

The vapors from flash chamber 11 pass via line 18 into a condenser 19 wherein the water and the chlorinated aliphatic hydrocarbon are condensed. The liquid condensate from condenser 19 is taken via line 37 to a separator 38 wherein a water layer separates from the chlorinated aliphatic hydrocarbon layer. The water layer is withdrawn from the separator 38 via line 39 and is preferably fed back into the flash chamber 11, thereby supplying part of the liquid water feed stream. The liquid chlorinated aliphatic hydrocarbon layer in separator 38 is withdrawn through line 40, e. g. to a drying still 41 or other device wherein the remaining water is removed (the wet vapors being returned via line 42 to condenser 19) and substantially anhydrous chlorinated aliphatic hydrocarbon material is withdrawn via line 43 to storage or other use.

The operations just described wherein the vapor stream taken from the flash chamber 11 via line 18 is treated to recover the chlorinated aliphatic hydrocarbon contained therein are illustrative of a suitable and preferred procedure for recovery of the chlorinated aliphatic hydrocarbon from such vapors. Alternatively, other uses can be made of the chlorinated aliphatic hydrocarbon-containing vapors, or the chlorinated aliphatic hydrocarbon contained therein can be recovered by means other than those shown.

The aqueous liquid dispersion 15 of the resin sulfonic acid is withdrawn from the flash chamber 11 via line 29 and can be treated as described in reference to Figure 1 to recover a substantially anhydrous resin sulfonate salt therefrom.

The operations shown and described for recovery of the resin sulfonate from the aqueous liquid dispersion 15 drawn from the flash chamber 11 via line 29 can be modified in many ways. Means other than the one shown can be used for drying the neutral salt, or the drying step can be eliminated entirely and the resin sulfonate can be obtained as an aqueous dispersion. In place of sodium hydroxide, other alkalies can be used in the neutralization step to obtain the corresponding alkali salt of the resin sulfonic acid, or the neutralization step can be eliminated entirely and the sulfonated resin can be obtained as the free resin polysulfonic acid. In another modification of this process, the resin sulfonic acid can be neutralized and converted to a resin sulfonate salt within the flash chamber 11, by feeding thereto an alkali via a line not shown. Although such a practice is not usually desirable when the starting slurry comprises sulfur dioxide (which reacts with alkali to form sulfurous acid salts), neutralization of the resin sulfonic acid in flash chamber 11 is permissible when the inert liquid in the starting slurry is a chlorinated aliphatic hydrocarbon. It is particularly advantageous when the aqueous dispersion 15 of the resin sulfonic acid is highly viscous, since an aqueous dispersion of a resin sulfonate salt is usually less viscous than an aqueous dispersion of the corresponding resin sulfonic acid and since the viscosity of an aqueous dispersion of a resin sulfonate salt is further reduced by the presence of inorganic salts such as sodium sulfate. Means other than the vacuum evaporator 30 can be used to strip traces of volatile non-aqueous materials from the liquid aqueous dispersion 15, or such steps can be eliminated altogether. The method is not dependent upon particular apparatus, and any devices can be used that are capable of carrying out the specified procedural steps.

It will be seen from this description that the present process eliminates the step of filtration of the slurry of resin sulfonate in the inert liquid medium in which the resin was sulfonated, and thereby avoids the difficulties attending such filtration step. It will also be seen that this method provides means for substantially complete recovery of such insert liquid medium in a form and condition suitable for use in the same or different process. It will further be seen that this method provides means for recovering the resin sulfonate substantially free of the inert liquid sulfonation medium. It should be pointed out that upon contacting the steam and/or water in the flash chamber, any sulfur trioxide or chlorosulfonic acid remaining unreacted in the feed slurry of sulfonated resin is instantly converted to sulfuric acid, and the resin sulfonate is converted to a water dispersion. In such aqueous liquid dispersion, the resin sulfonate is not subject to the detrimental side-reactions, such as the formation of sulfone cross-linkages, that often occur in the usual process of recovering resin sulfonates from their reaction mixtures.

It should also be pointed out that the present method is limited to slurries of water-dispersible resin sulfonates and is not applicable to slurries of water-insoluble resin sulfonates in large bead form, e. g. in the form of spheroids having diameters in the range from 0.1 to 1.0 mm. or more, such as are made for use as ion-exchange resins. Between the resin sulfonates which are substantially insoluble but colloidally dispersible in water and those which are freely soluble in water, are those which are highly swellable by water and cause thickening of the aqueous dispersion. In the present process, viscous dispersions of highly swollen resin sulfonates are more difficult to handle in the flash chamber and other equipment than are less viscous solutions or dispersions. This difficulty can be minimized by judicious design of the apparatus, by operating with more dilute solutions, by converting the resin sulfonic acid to an alkali salt in the flash chamber, or by adding inorganic salts to the dispersion as hereinbefore described. For convenience in operation, the process should be carried out so that the viscosity of the aqueous liquid dispersion obtained in the flash chamber is not more than about 5000 centipoises, preferably not more than about 1000 centipoises.

The following examples illustrate the invention but should not be construed as limiting its scope.

Example 1

This example concerns the practice of the invention on a starting feed slurry of a water-dispersible sulfonated polystyrene prepared by reaction of sulfur trioxide on polystyrene dispersed in liquid sulfur dioxide, which slurry contains 10 percent by weight of polystyrene polysulfonic acid, with reference to the embodiment of Figure 1 of the drawing.

The starting feed slurry just described is fed continuously at an average rate of 10 pounds per hour to the vapor space of a flash chamber operated at atmospheric pressure and with a vapor temperature of approximately 66° C. To the flash chamber is also fed steam at an average rate of 2.95 pounds per hour, part of which is fed to the vapor space and part to the liquid layer in the flash chamber. A stream of water is fed to a system of spray nozzles in the vapor space of the flash chamber at an average rate of 6.2 pounds per hour.

From the flash chamber, a vapor stream containing an average of 91.2 percent by weight sulfur dioxide is passed at an average rate of 9.8 pounds per hour to a partial condenser cooled with water at 35° C. (Another vapor stream is also passed into the condenser from the vacuum evaporator as hereinafter described.) A liquid aqueous condensate, containing approximately 13.6 percent by weight sulfur dioxide, is pumped from the condenser and fed at an average rate of 0.81 pound per hour to the flash chamber together with the fresh water feed. From the condenser, an uncondensed sulfur dioxide gas stream containing approximately 1.8 percent by weight water is passed into a liquid-gas scrubber tower at an average rate of 9.11 pounds per hour in flow countercurrent to 98 percent by weight sulfuric acid fed to the scrubber at an average rate of 0.66 pound per hour. From the bottom of the scrubber is drawn 79 percent by weight sulfuric acid at an average rate of 0.82 pound per hour. From the top of the scrubber is drawn substantially anhydrous sulfur dioxide gas which is compressed, cooled, liquified, and sent to storage at an average rate of 8.92 pounds per hour, corresponding to a recovery of 99.1 percent of the sulfur dioxide in the original feed slurry.

From the flash chamber is also drawn a liquid aqueous dispersion at an average rate of 10.2 pounds per hour, the dispersion containing approximately 9.8 percent by weight resin sulfonic acid and approximately 1.7 percent by weight sulfur dioxide. This dispersion is pumped into a vacuum evaporator operating at 200 mm. of mercury absolute pressure and 60° C. From the vacuum evaporator, a vapor stream containing approximately 66.7 percent by weight sulfur dioxide is passed at an average rate of 0.18 pound per hour to the partial condenser already described. Also from the vacuum evaporator is pumped a liquid aqueous dispersion containing approximately 10 percent by weight resin sulfonic acid and approximately 0.5 percent by weight sulfur dioxide. This liquid aqueous dispersion is pumped at an average rate of 10 pounds per hour to a neutralizer and there is mingled with sodium hydroxide aqueous solution in stoichiometric proportion to yield a neutral salt of the resin sulfonic acid. The neutral salt dispersion is passed from the neutralizer to a drum drier and dried to substantially anhydrous polystyrene polysulfonic acid, sodium salt, at an average rate of one pound per hour on the basis of polystyrene polysulfonic acid in the sodium salt form.

Example 2

This example concerns the practice of the invention on a starting feed slurry of a water-soluble sulfonated polyvinyltoluene prepared by reaction of sulfur trioxide on polyvinyltoluene (a polymer of a mixture of meta-methylstyrene and para-methylstyrene) dispersed in methylene chloride, which slurry contains 3 percent by weight of the polymer polysulfonic acid, with reference to the embodiment of Figure 2 of the drawing.

The starting feed slurry just described is fed continuously to the vapor space of a flash chamber operated at atmospheric pressure and with a vapor temperature in the range from 50° to 60° C. Also fed to the flash chamber is steam (in part to the vapor space and in part to the liquid aqueous solution contained therein) and liquid water, the latter being sprayed through a system of spray nozzles in the vapor space.

The vapor from the flash chamber consists essentially of methylene chloride and water vapor and is taken to the condenser and totally condensed. The liquid condensate is passed to a separator wherein the condensate separates into two layers, one of which is principally water and the other of which is principally methylene chloride. The water layer from the separator is drawn off and pumped to the flash chamber as part of the water fed to the spray nozzles. The methylene chloride layer from the separator is fed to a still from which an overhead distillate of water and methylene chloride is passed back to the condenser previously described. From the still, a substantially anhydrous bottom fraction consisting essentially of methylene chloride is drawn off to storage, such fraction being substantially all of the methylene chloride originally present in the feed slurry.

From the flash chamber is also drawn a stream of liquid aqueous solution containing about 5 percent by weight polymer polysulfonic acid. This stream is pumped to a vacuum evaporator operating at approximately 200 mm. of mercury, absolute pressure, and in range from 50° to 60° C. The vapors from the vacuum evaporator contain methylene chloride and are passed to the condenser previously described. The liquid aqueous solution of polymer polysulfonic acid from the vacuum evaporator is converted to the neutral sodium salt in the neutralizer and dried in the manner described in Example 1, thereby obtaining a substantially anhydrous polyvinyltoluene polysulfonic acid, sodium salt.

When the starting feed slurry of water-dispersible sulfonate comprises a mixture of sulfur dioxide and a liquid chlorinated aliphatic hydrocarbon, the invention can be practiced substantially as described in the foregoing examples except that the treatment of the vapor stream from the flash chamber is modified to recover the sulfur dioxide and the chlorinated aliphatic hydrocarbon therefrom. In one such modification, the vapor from the flash chamber is partially condensed and the water-layer of the condensate is returned to the flash chamber. The chlorinated aliphatic hydrocarbon layer from the condensate and the uncondensed vapors passing through the condenser are dehydrated and fractionally distilled to separate a recovered sulfur dioxide and a recovered chlorinated aliphatic hydrocarbon.

The procedures just described are preferably carried out in continuous manner, but it is evident that the procedures can be modified to practice the invention in discontinuous batches.

I claim:

1. In a method for the preparation of water-dispersible resin sulfonates wherein a benzene-soluble thermoplastic solid addition polymer consisting of polymeric units at least 50 percent by weight of which correspond to at least one mono-alkenylaromatic hydrocarbon is dispersed in liquid sulfur dioxide and is therein sulfonated by reaction with a sulfonation agent selected from the group consisting of sulfur trioxide and chlorosulfonic acid to obtain a slurry of a water-dispersible solid resin sulfonate in liquid sulfur dioxide in proportions corresponding to not more than 10 percent by weight of the resin sulfonate based on the resulting slurry, which contains appreciable proportions of unreacted sulfonation agent, the improvement which comprises continuously feeding that slurry, consisting essentially of not more than 10 percent by weight of a water-dispersible solid sulfonate of a benzene-soluble thermoplastic solid addition polymer consisting of polymeric units at least 50 percent by weight which correspond to at least one monoalkenylaromatic hydrocarbon, liquid sulfur dioxide, and appreciable proportions of unreacted sulfonation agent, into the vapor space of a flashing zone containing liquid water and steam at approximately atmospheric pressure, continuously feeding to the flashing zone liquid water at an average rate corresponding to at least six times the average rate of feed to the flashing zone of solid resin sulfonate on a weight basis, continuously feeding to the flashing zone steam at an average rate corresponding to at least one-third the average rate of feed to the flashing zone of liquid sulfur dioxide on a weight basis, intimately contacting the slurry of solid resin sulfonate and liquid sulfur dioxide with the liquid water and steam in the flashing zone, continuously withdrawing from the flashing zone the resulting vapor mixture of sulfur dioxide and steam, and continuously withdrawing from the flashing zone the resulting aqueous liquid dispersion of the water-dispersible resin sulfonate containing not more than 10 percent by weight of the water-dispersible resin sulfonate and having a viscosity not greater than 5000 centipoises.

2. The improvement according to claim 1, wherein the mono-alkenylaromatic hydrocarbon is styrene.

3. The improvement according to claim 1, wherein the mono-alkenylaromatic hydrocarbon is an ar-methylstyrene.

References Cited in the file of this patent
UNITED STATES PATENTS

| | | |
|---|---|---|
| 2,533,210 | Baer | Dec. 12, 1950 |
| 2,537,130 | Green | Jan. 9, 1951 |
| 2,592,814 | Ludlow | Apr. 15, 1952 |